United States Patent [19]

Rager

[11] 4,166,622

[45] Sep. 4, 1979

[54] CENTERING COLLAR FOR A DISK HUB

[76] Inventor: Edgar A. Rager, 601 Almarida, Apt. T6, Campbell, Calif. 95008

[21] Appl. No.: 877,183

[22] Filed: Feb. 13, 1978

[51] Int. Cl.² ............................ G11B 3/70; G11B 5/82; B25G 3/10
[52] U.S. Cl. .................... 274/1 R; 274/42 R; 360/135; 403/366; 403/372
[58] Field of Search .............. 403/372, 366, 365, 13, 403/14; 360/135, 97, 98, 99, 86; 274/1 R, 42 R

[56] References Cited
U.S. PATENT DOCUMENTS 3,360,208  12/1967  Winkler .............................. 403/366

Primary Examiner—Steven L. Stephan
Attorney, Agent, or Firm—Thomas Schneck, Jr.

[57] ABSTRACT

A collar construction for a disk hub in which the interior of the collar is adapted with a plurality of cylinders truncated in a shape mating with portions of a spindle to which the hub is fit. The cylinders have longitudinal slots extending partially therethrough allowing compression of the cylinders when in contact with a spindle. The collar is used for centering a disk on a spindle.

7 Claims, 7 Drawing Figures

CENTERING COLLAR FOR A DISK HUB

BACKGROUND OF THE INVENTION a. Field of the Invention

The invention relates to hubs used for supporting data storage media and more particularly, to a hub collar construction for centering a hub on a spindle.

b. Prior Art

Disk recording media are used in the computer industry for storage of large amounts of data. The recording media may contain millions of bytes of data which are accessible to the computer by means of a transducer or reading head which scans the data as it rotates at high speed relative to the recording head. The recording medium may be a ferromagnetic material having magnetic characteristics which make it suitable for reading or may have optical characteristics which make it suitable for reading, or may have still other characteristics. However, in most instances the medium itself is somewhat fragile and although it typically rotates at high speed, the medium itself is not attached to a spindle. Rather, the medium is mechanically attached to and supported by a hub which in turn is connected to a spindle or other spinner mechanism of a motor.

One class of hubs is adapted for mounting on a rotating spindle by means of a special collar in the interior of the hub for centering the hub with respect to a spindle which fits within the collar. The hub must be accurately centered because data reading and writing transducers rely on the concentricity of the data tracks. While adjustments of the transducers are made by servos, the data tracks are centered at the geometric center of a hub which should have its geometric center coincide with the geometric center of a spindle, usually driven by a motor. A prior art hub is illustrated in FIGS. 1 and 1a of the drawings. The annular hub 11 has an annular collar 13 in its interior, for placement on a spindle. The geometric center of the collar coincides with the axis of rotation of hub 11 and a rotating spindle on which the hub is placed. Collar 13 is usually machined out of metal and is tightly pressed into place in the center of a hub.

In FIG. 1 an annular collar 13 of the prior art is shown by the dashed lines D to have been removed upwardly to show its construction. This construction may be seen more clearly in FIG. 1a. The collar 13 has an inside surface 15 and an outside surface 17. The inside and outside surfaces are in fact walls separated by a circular groove 16, which extends part of the way from the top to the bottom of the collar. The bottom of the collar supports the inner and outer walls. The inside surface 15 is interrupted at intervals by short wall portions 19, 21, 23 which project inwardly more than the remainder of the inside wall. The wall portions 19, 21, 23 form tangs which compressibly contact the exterior of a spindle for accurate centering of a hub on the spindle. It should be noted that the tangs do not transfer mechanical energy to or from the hub for spinning. Such energy is transferred by other means, such as by lugs or bolts which do not influence alignment of the hub with respect to the spindle.

However, as can be seen from FIG. 1a it is quite difficult to manufacture the collar shown. The inside wall has different circular diameters. The first and greatest diameter is formed by the main portion of the inside surface 15 of the wall, while other, lesser diameters are defined by the portion of tangs 19, 21, 23 facing the axis of rotation. The upper portion of each tang 19, 21, 23 has a diameter approximately one or two thousandths of an inch less than the lower portion thereof, which in turn has a diameter approximately twenty thousandths of an inch less than the main wall portion of inside surface 15. The construction of the collar 13 requires intricate machining, such that most of the cost of the hub is represented by the collar 13.

SUMMARY OF THE INVENTION

An object of the present invention is to devise a hub collar construction for centering a hub on a spindle which has a simplified construction and lower cost compared to prior art ring type collars.

This object has been achieved in an annular hub member having a central hole provided with a plurality of identations about the periphery of the hole. Each indentation is shaped to accommodate a compression member which is a cylinder truncated by an arc having its origin or center at the axis of rotation or spinning axis of the hub. A portion of the truncated cylinder is shaped to contact the outside of a rotating spindle which it faces when the hub is placed on the spindle. The cylinder has a longitudinal slot extending partially therethrough which allows compression of the cylinder when the hub contacts the spindle. The cylindrical periphery of the compression member interlocks with the circular shape of indentation provided in the annular hub. The compression member projects into the hole of the annular member further than the inside dimension of the annular member which defines the hole. The compression members may be made by any means, such as casting or stamping, and final machining to desired tolerances. A plurality of compression members may be machined simultaneously because each compression member occupies only a small arc in a round fixture used for the machining operation. The present invention enables a hub to have its spinning axis coincide with the axis of rotation of a spindle.

DESCRIPTION OF THE PREFERRED EMBODIMENT

Figure 2:
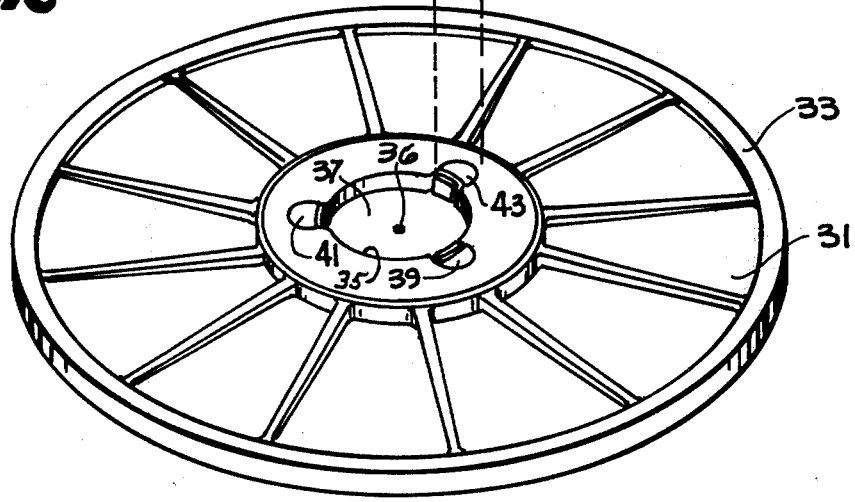
FIG. 2 is a perspective, partially exploded view of the apparatus of the present invention.
Figure 1A:
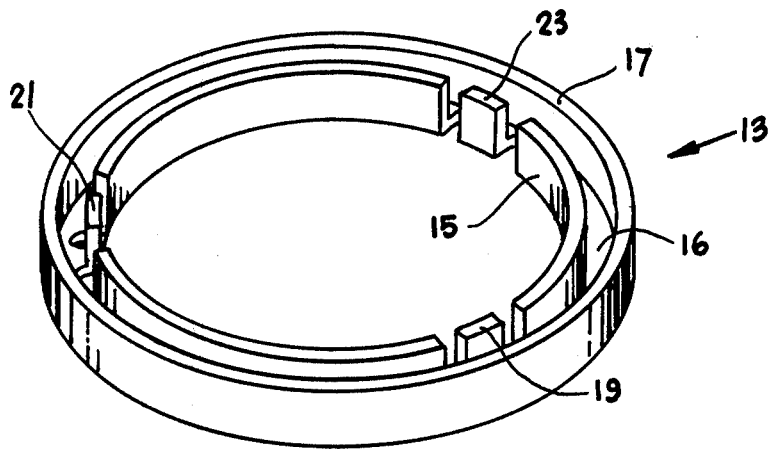
FIG. 1a is a top view of the collar of FIG. 1.

With reference to FIG. 2, an annular hub member 31 is shown which has a circular outer periphery 33 and a circular inner periphery 35. The dimension of the inner periphery 35 exceeds the dimension of a spindle on which the hub is placed. A flange 37 at the base of the inner periphery 35 supports items placed thereon, but flange 37 does not contact the spindle because the spindle is prevented from advancing into the inner hub periphery to that depth by the compression members described herein. The presence of flange 37 is not critical, but merely preferred in most hubs.

The inner periphery 35 of hub 31 defines a central hole which has flange 37 at its lower extremity, with dimensions greater than the circumference of a spindle on which the annular hub member 31 is intended to fit. The inner periphery 35 has a plurality of indentations 39, 41, 43 which are concave with respect to the hole defined by the inner periphery 35 of hub 31. Such indentations may be formed in the manufacture of hub 31, for example by die cast manufacture of hub 31. It is typical that the hub be made of die cast aluminum or magnesium, but there are no limitations on the nature of materials which may be used to manufacture the hub. The indentations should be preferably three in number and be equally spaced about the periphery of the disk. More indentations may be provided, if desired.

In FIG. 2, the hub 31 is shown such that a spindle projects into the hub from above. The recording medium is fastened to the under side of the hub, for example by means of screws which are inserted into receiving members, such as holes, not shown. In use, the recording medium would typically be on top with the entire hub upside down from the position shown in FIG. 2. However, the inverted position of the hub in FIG. 2 is useful for illustrating the manner in which the compression members, such as member 51, fit into indentations, such as indentation 43 in the inner periphery 35 of the hub. Hub 31 has a geometric center 36 within inner periphery 35. The compression members of the present invention cause the geometric center 36 to coincide with the axis of rotation of a spindle projecting into the hub and contacting the compression members described herein.

Figure 1:
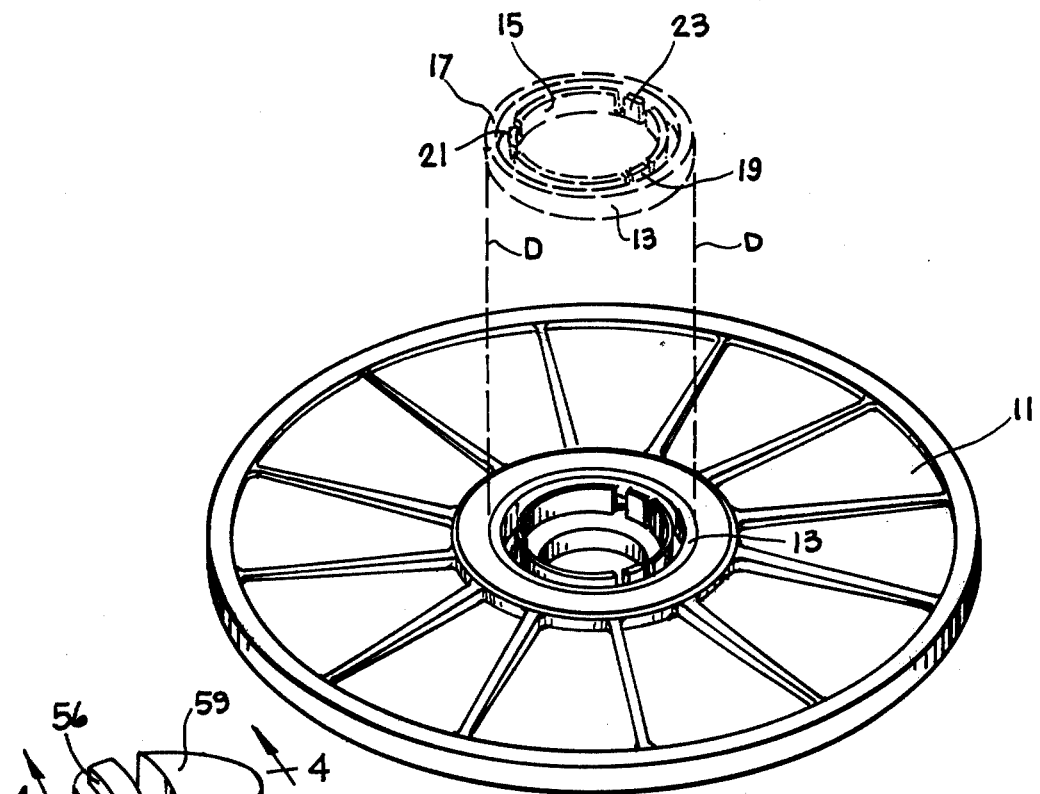
FIG. 1 is a perspective view of a prior art hub with a collar for connection to a spindle.
Figure 3:
FIG. 3 is a perspective view of a compression member for use in the apparatus of FIG. 2.
Figure 4:
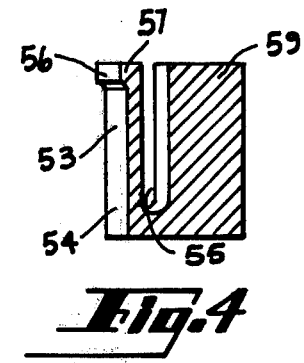
FIG. 4 is a side sectional view of the compression member of FIG. 3 taken along the lines 4—4 therein.

In FIG. 3, a typical compression member 51 may be seen more clearly. Compression member 51 is a cylinder cut from round bar stock in short pieces approximately three quarters of an inch in length. Each cylinder is truncated along concave face 53 having its concave radius originating at the geometric center 36 of hub 31. Concave face 53 has a lower portion 54 having a shape defined by a circular arc originating at the hub axis, but having an arc radius less than the radius of the inner periphery 35 of hub 31 by approximately 0.020 inches, although this exact amount is not critical. Concave face 53 is slightly closer to the disk geometric center 36 than the inner periphery 35 in FIG. 2. Concave face 53 of cylindrical member 51 also has an upper portion 56 having an inward and upward taper as shown in FIG. 4. Returning to FIG. 3, upper portion 56 of concave face 53 has its shape defined by a circular arc originating at the annular hub spinning axis, but having an arc radius a few thousandths of an inch less than the radius of the arc defining lower portion 54. Upper portion 56 is the portion of compression member 51 which projects furthest inwardly and contacts a spindle.

The semi-circular cross section of cylindrical compression member 51 interlocks with the semicircular shape of the indentation into which it snugly fits. A longitudinal slot 55 partially extends from the top of the cylindrical compression member 51 to a region near the bottom thereof so that a finger 57 is formed standing off from the main body of compression member 51. The upper portion 56 of finger 57 facing the interior of the hole within the hub contacts corresponding portions of the spindle with which it comes into contact and centers the geometric center of the hub on the axis of rotation of the spindle. Slot 55, extending behind finger 57 allows the finger to be pushed back slightly against the main body 59 of compression member 51 to assure positive contact between the compression member and the spindle.

Compression member 51 is made of a hard material, preferably steel and may be molded or cast or machined to form the desired shape. The height of the cylindrical compression member 51 is such that when the compression member 51 is in an indentation it generally matches the height of the inner periphery of the hub in which it is press fit in an interlocking relation therewith, although the compression member 51 may be bonded in place if the indentation into which it fits does not provide an interlocking relation. It is important that the face of each compression member projects inwardly toward the axis of the disk and hub a sufficient distance so that the inner periphery of the hub does not contact the spindle. The only contact made with the spindle is by the upper portion 56 of the concave face of finger 57.

Figure 5:
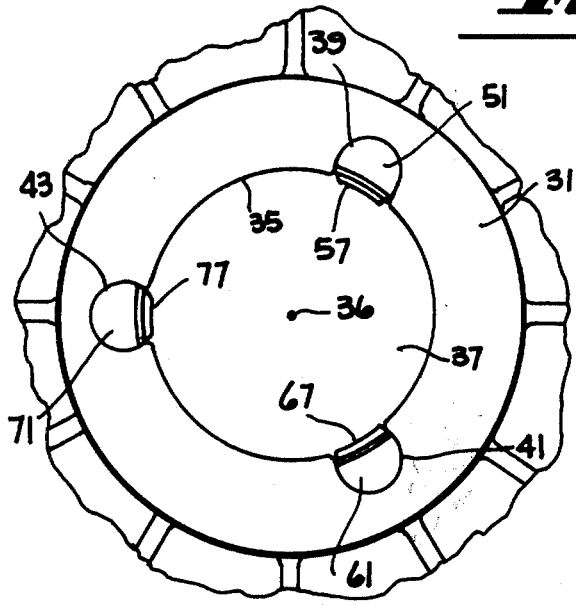
FIG. 5 is a partial top view of the apparatus of FIG. 2.

FIG. 5 shows the semicircular shape of the indentations 39, 41 and 43. Compression members 51, 61, 71 have fingers 57, 67, 77 which project inwardly beyond the inner periphery 35 of the hub 31. Of course, the spindle for the hub need not be circular. If a square or polygonal spindle is used, the inner periphery of hub 31 would be shaped to be geometrically similar so that the hub could be pressed onto the spindle. The cylindrical compression members would still have fingers with upper portions which contact the spindle but the fingers would not be portions of the cylinder truncated by an arc. Rather, the truncation could be by a straight line parallel to the polygonal dimension of the spindle which the finger faced.

Figure 6:
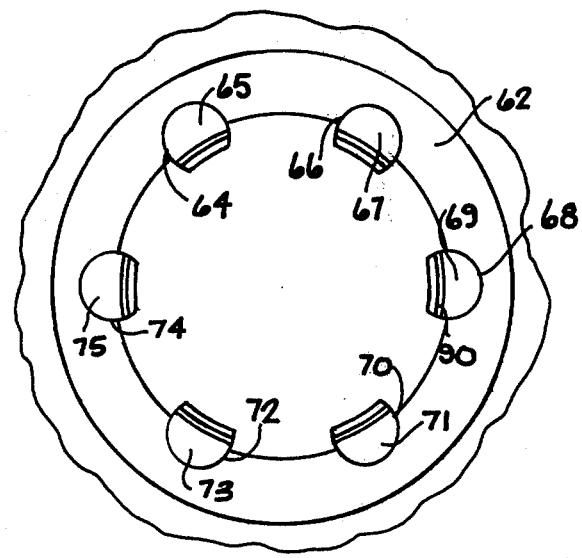
FIG. 6 is a partial top view of a jig for making the compression members of FIG. 3.

FIG. 6 shows a jig 62 for machining a plurality of cylindrical compression members of the type shown in FIG. 3. Compression members are secured in some or all of the indentations 64, 66, 68, 70, 72 and 74 of a fixture having the same inside radius from a spinning axis as the inner periphery of a hub. Compression members 65, 67, 69, 71, 73 and 75 may be placed in jig 62 before or after cutting a slot therein. The fixture is rotated, as in a lathe and the concave faces of the compression members are cut simultaneously by a tool which first cuts one of the upper or lower portion of these members and then the other portion, moving from one portion to the other with a smooth taper. Once machined the cylindrical compression members have concave faces formed thereon, a slot may be cut therein, if not previously done, providing the shape of the indentation permits this. For example, indentation 68 accommodates cylindrical compression member 69 therein leaving enough of member 69 exposed for cutting slot 90 therein with a rotary cutting tool.

The number of indentations shown in the jig 62 of FIG. 6 is not critical; more or less may be used. Those skilled in the art may realize other ways of making the cylindrical members described herein.

I claim:

1. Apparatus for centering a member on a rotating spindle comprising, an annular member defining a central hole with dimensions greater than corresponding outside dimensions of the rotating spindle on which said annular member is intended to fit, said annular member having a geometric center corresponding to the axis of rotation of the spindle, said annular member having a plurality of indentations spaced at intervals facing said central hole, and a plurality of compression members, each shaped to fit in an interlocking relationship with an indentation of said annular member and partially projecting into said hole, said compression members having a finger portion compressibly connected to the remainder of said compression member, said finger shaped to snugly contact corresponding portions of a spindle so that said annular member is centered on said spindle.

2. The apparatus of claim 1 wherein each compression member is disposed in an indentation of said annular member by means of an interlocking connection therebetween.

3. The apparatus of claim 1 wherein each compression member is a cylinder truncated by an arc whose origin corresponds to the geometric center of said annular member and having a longitudinal slot partially therethrough separating said finger from the remainder of said compression member.

4. The apparatus of claim 1 wherein said indentations are equally spaced in said annular member.

5. The apparatus of claim 4 wherein the number of indentations is at least three.

6. In a hub for a disk recording medium of the type in which the hub has an inside perimeter which is fit onto a rotating spindle, the improvement comprising, a plurality of cylinders, truncated in a shape mating with a portion of a rotating spindle to which said hub is fit, said cylinders affixed to the inside perimeter of the hub, for causing the center of said hub to coincide with the rotational axis of the spindle, said truncated cylinders having a longitudinal slot extending partially therethrough for allowing compression of said cylinders when in contact with a spindle, thereby centering said hub on said spindle.

7. The apparatus of claim 6 wherein said cylinders are affixed to the inside perimeter of said hub by interlocking placement in indentations defined in said perimeter.

* * * * *